(12) United States Patent
Barnett et al.

(10) Patent No.: US 10,959,017 B2
(45) Date of Patent: *Mar. 23, 2021

(54) ARRAY MICROPHONE MODULE AND SYSTEM

(71) Applicant: Shure Acquisition Holdings, Inc., Niles, IL (US)

(72) Inventors: Zachery Barnett, Chicago, IL (US); Brent Robert Shumard, Mount Prospect, IL (US); David Grant Cason, Palatine, IL (US); Andrey Ash, Morton Grove, IL (US); Jordan Schultz, Chicago, IL (US); Mathew T. Abraham, Colorado Springs, CO (US); Avinash K. Vaidya, Riverwoods, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,927

(22) Filed: Oct. 7, 2019

(65) Prior Publication Data

US 2020/0037068 A1 Jan. 30, 2020

Related U.S. Application Data

(63) Continuation of application No. 15/880,151, filed on Jan. 25, 2018, now Pat. No. 10,440,469.

(Continued)

(51) Int. Cl.
*H04R 1/40* (2006.01)
*H04R 3/00* (2006.01)
(Continued)

(52) U.S. Cl.
CPC ............. *H04R 1/406* (2013.01); *H04R 3/005* (2013.01); *H04M 3/568* (2013.01);
(Continued)

(58) Field of Classification Search
CPC ............. H04R 3/005; H04R 2201/401; H04R 2201/405
(Continued)

(56) References Cited

U.S. PATENT DOCUMENTS 5,000,286 A 3/1991 Crawford
5,657,393 A 8/1997 Crow
(Continued)

FOREIGN PATENT DOCUMENTS

CN 104244164 12/2014
CN 105074812 11/2015
(Continued)

OTHER PUBLICATIONS

AVNetwork, "Top Five Conference Room Mic Myths," Feb. 25, 2015, 14 pp.
(Continued)

*Primary Examiner* — Alexander Krzystan
(74) *Attorney, Agent, or Firm* — Neal, Gerber & Eisenberg LLP

(57) ABSTRACT

A microphone module comprises a housing, an audio bus, and a first plurality of microphones in communication with the audio bus. The microphone module further comprises a module processor in communication with the first plurality of microphones and the audio bus. The module processor is configured to detect the presence of an array processor in communication with the audio bus, detect the presence of a second microphone module in communication with the audio bus, and configure the audio bus to pass audio signals
(Continued)

from both the first plurality of microphones and the second microphone module to the array processor.

29 Claims, 9 Drawing Sheets

Related U.S. Application Data

(60) Provisional application No. 62/451,480, filed on Jan. 27, 2017.

(51) Int. Cl.
  *H04M 3/56* (2006.01)
  *H04R 27/00* (2006.01)

(52) U.S. Cl.
  CPC ....... *H04M 2203/509* (2013.01); *H04R 27/00* (2013.01); *H04R 2201/401* (2013.01); *H04R 2201/403* (2013.01); *H04R 2227/003* (2013.01); *H04R 2430/20* (2013.01)

(58) Field of Classification Search
  USPC .......................................... 381/92, 361, 356
  See application file for complete search history.

(56) References Cited

U.S. PATENT DOCUMENTS

| | | | |
|---|---|---|---|
| 5,714,723 | A | 2/1998 | Kang |
| 7,366,310 | B2 | 4/2008 | Stinson |
| 7,415,117 | B2 | 8/2008 | Tashev |
| 7,667,728 | B2 | 2/2010 | Kenoyer |
| 7,787,328 | B2 | 8/2010 | Chu |
| 8,041,054 | B2 | 10/2011 | Yeldener |
| 8,085,949 | B2 | 12/2011 | Kim |
| 8,112,272 | B2 | 2/2012 | Nagahama |
| 8,130,977 | B2 | 3/2012 | Chu |
| 8,135,143 | B2 | 3/2012 | Ishibashi |
| 8,155,331 | B2 | 4/2012 | Nakadai |
| 8,428,661 | B2 | 4/2013 | Chen |
| 8,600,097 | B2 | 12/2013 | McGhee |
| 8,600,443 | B2 | 12/2013 | Kawaguchi |
| 8,660,274 | B2 | 2/2014 | Wolff |
| 8,675,890 | B2 | 3/2014 | Schmidt |
| 8,682,675 | B2 | 3/2014 | Togami |
| 8,824,693 | B2 | 9/2014 | Åhgren |
| 8,861,756 | B2 | 10/2014 | Zhu |
| 8,923,529 | B2 | 12/2014 | McCowan |
| 8,929,564 | B2 | 1/2015 | Kikkeri |
| 8,983,089 | B1 | 3/2015 | Chu |
| 9,197,962 | B2 | 11/2015 | Elko |
| 9,226,062 | B2 | 12/2015 | Sun |
| 9,226,070 | B2 | 12/2015 | Hyun |
| 9,264,805 | B2 | 2/2016 | Buck |
| 9,307,326 | B2 | 4/2016 | Elko |
| 9,354,310 | B2 | 5/2016 | Visser |
| 9,392,381 | B1 | 7/2016 | Park |
| 9,565,493 | B2 | 2/2017 | Abraham |
| 2003/0118200 | A1* | 6/2003 | Beaucoup ............... H04M 3/56 381/110 |
| 2003/0138119 | A1 | 7/2003 | Pocino |
| 2004/0175006 | A1 | 9/2004 | Kim |
| 2005/0175190 | A1 | 8/2005 | Tashev |
| 2006/0093128 | A1 | 5/2006 | Oxford |
| 2008/0008339 | A1 | 1/2008 | Ryan |
| 2010/0165071 | A1 | 7/2010 | Ishibashi |
| 2011/0002469 | A1 | 1/2011 | Ojala |
| 2012/0093344 | A1 | 4/2012 | Sun |
| 2012/0327115 | A1 | 12/2012 | Chhetri |
| 2013/0304476 | A1 | 11/2013 | Kim |
| 2013/0329908 | A1 | 12/2013 | Lindahl |
| 2013/0343549 | A1 | 12/2013 | Vemireddy |
| 2014/0003635 | A1* | 1/2014 | Mohammad .......... G10K 11/16 381/306 |
| 2014/0314251 | A1 | 10/2014 | Rosca |
| 2015/0050967 | A1 | 2/2015 | Bao |
| 2015/0156578 | A1 | 6/2015 | Alexandridis |
| 2015/0237424 | A1 | 8/2015 | Wilker |
| 2015/0312691 | A1 | 10/2015 | Virolainen |
| 2015/0341734 | A1 | 11/2015 | Sherman |
| 2016/0021478 | A1 | 1/2016 | Katagiri |
| 2016/0088392 | A1 | 3/2016 | Huttunen |
| 2016/0165340 | A1 | 6/2016 | Benattar |
| 2017/0308352 | A1 | 10/2017 | Kessler |

FOREIGN PATENT DOCUMENTS

| | | |
|---|---|---|
| CN | 105828266 | 8/2016 |
| WO | 1997008896 | 3/1997 |
| WO | 2003088429 | 10/2003 |
| WO | 2018140618 | 8/2018 |

OTHER PUBLICATIONS

Cech, et al., "Active-Speaker Detection and Localization with Microphones and Cameras Embedded into a Robotic Head," IEEE-RAS International Conference on Humanoid Robots, Oct. 2013, pp. 203-210.

ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.

Firoozabadi, et al., "Combination of Nested Microphone Array and Subband Processing for Multiple Simultaneous Speaker Localization," 6th International Symposium on Telecommunications, Nov. 2012, pp. 907-912.

International Search Report and Written Opinion for PCT/US2018/015269 dated Mar. 26, 2018.

Invensense, "Microphone Array Beamforming, Application Note AN-1140", Dec. 31, 2013, 12 pp.

Pasha, et al., "Clustered Multi-channel Dereverberation for Ad-hoc Microphone Arrays," Proceedings of APSIPA Annual Summit and Conference, Dec. 2015, pp. 274-278.

Phoenix Audio Technologies, "Beamforming and Microphone Arrays—Common Myths", Apr. 2016, http://info.phnxaudio.com/blog/microphone-arrays-beamforming-myths-1.

SerDes, Wikipedia article, last edited on Jun. 25, 2018; retrieved on Jun. 27, 2018, 3 pp., https://en.wikipedia.org/wiki/SerDes.

Weinstein, et al., "LOUD: A 1020-Node Modular Microphone Array and Beamformer for Intelligent Computing Spaces," MIT Computer Science and Artifical Intelligence Laboratory, 2004, 17 pp.

International Search Report and Written Opinion for PCT/US2019/051491 dated Dec. 10, 2019, 13 pp.

* cited by examiner

ARRAY MICROPHONE MODULE AND SYSTEM

CROSS-REFERENCE TO RELATED APPLICATIONS

This application is a continuation of U.S. patent application Ser. No. 15/880,151, filed on Jan. 25, 2018, which claims the benefit of U.S. Provisional Patent Application No. 62/451,480, filed on Jan. 27, 2017. The contents of these applications are incorporated herein in their entireties.

TECHNICAL FIELD

This application generally relates to an array microphone module and systems therefore. In particular, this application relates to an array microphone module that is capable of being connected with other like array microphone modules to create a configurable system of modular array microphone modules.

BACKGROUND

Conferencing environments, such as conference rooms, boardrooms, video conferencing applications, and the like, can involve the use of microphones for capturing sound from various audio sources active in such environments. Such audio sources may include humans speaking, for example. The captured sound may be disseminated to a local audience in the environment through amplified speakers (for sound reinforcement), or to others remote from the environment (such as via a telecast and/or a webcast).

Traditional microphones typically have fixed polar patterns and few manually selectable settings. To capture sound in a conferencing environment, many traditional microphones are often used at once to capture the audio sources within the environment. However, traditional microphones tend to capture unwanted audio as well, such as room noise, echoes, and other undesirable audio elements. The capturing of these unwanted noises is exacerbated by the use of many microphones.

Array microphones provide benefits in that they have steerable coverage or pick up patterns, which allow the microphones to focus on the desired audio sources and reject unwanted sounds such as room noise. The ability to steer audio pick up patterns provides the benefit of being able to be less precise in microphone placement, and in this way, array microphones are more forgiving. Moreover, array microphones provide the ability to pick up multiple audio sources with one array microphone or unit, again due to the ability to steer the pickup patterns.

However, array microphones have certain shortcomings, including the fact that they are typically relatively larger than traditional microphones, and their fixed size often limits where they can be placed in an environment. Moreover, when larger numbers of array microphones are used, the microphone elements of one array microphone do not work in conjunction with the microphone elements of another array microphone. Systems of array microphones can often be difficult to configure properly. Also, array microphones are usually significantly more costly than traditional microphones. Given these shortcomings, array microphones are usually custom fit to their application, causing them to be primarily used in large scale, highly customized, and costly installations.

Accordingly, there is an opportunity for systems that address these concerns. More particularly, there is an opportunity for modular systems including an array microphone module that is easily scalable, flexible in mounting position, and self configuring to allow the system to optimally detect sounds from an audio source, e.g., a human speaker, and reject unwanted noise and reflections.

SUMMARY

The invention is intended to solve the above-noted problems by providing systems and methods that are designed to, among other things: (1) provide an array microphone module that is modular and scalable, and can be connected to other such modules to create array microphone systems of easily customized shapes and sizes; and (2) provide an array microphone system comprising an array processor connected to a plurality of such array microphone modules to achieve a self-configuring array microphone system with improved directional sensitivity.

In an embodiment, a microphone module comprises a housing, an audio bus, and a first plurality of microphones supported by the housing. Each of the first plurality of microphones is in communication with the audio bus. The microphone module further comprises a module processor in communication with the first plurality of microphones and the audio bus. The module processor is configured to detect the presence of an array processor in communication with the audio bus, detect the presence of a second microphone module in communication with the audio bus, and configure the audio bus to pass audio signals from both the first plurality of microphones and the second microphone module to the array processor.

In another embodiment, a modular array microphone system comprises an array processor and a microphone module. The microphone module comprises a housing, an audio bus in communication with the array processor, and a plurality of microphones supported by the housing, each of the plurality of microphones in communication with the audio bus. The microphone module further comprises a module processor in communication with the plurality of microphones and the audio bus, the module processor configured to detect the presence of the array processor connected to the audio bus, detect the presence of a second microphone module in communication with the audio bus, and configure the audio bus to pass audio from both the plurality of microphones and the second microphone module to the array processor.

In yet another embodiment, a modular array microphone system comprises an array processor, an audio bus, and N microphone modules, where N is at least 2. Each of the N microphone modules comprises a housing, a plurality of microphones supported by the housing, and a module processor in communication with the plurality of microphones and the audio bus. The audio bus connects the array processor and the N microphone modules such that the plurality of microphones in each of the N microphone modules is in communication with the array processor. One or more of the array processor and the module processors in the N microphone modules is configured to detect a quantity and a connection order of the N microphone modules, and configure the audio bus to route audio signals from the plurality of microphones in each of the N microphone modules to the array processor.

In yet another embodiment, a microphone module comprises a housing, having a length, a first end and a second end, an audio bus, and a plurality of microphones arranged along the length of the housing, each of the plurality of microphones positioned generally in a direction transverse to the length, each of the plurality of microphones in communication with the audio bus. The microphone module further comprises a module processor in communication with the plurality of microphones and the audio bus, the module processor configured to detect the presence of an array processor in communication with the audio bus, detect the presence of a second microphone module in communication with the audio bus, and configure the audio bus to pass audio from both the plurality of microphones and the second microphone module to the array processor.

In yet another embodiment, a microphone module comprises a housing, an audio bus, and a plurality of microphones supported by the housing, each of the plurality of microphones in communication with the audio bus. The microphone module further comprises a module processor in communication with the plurality of microphones and the audio bus, the module processor configured to detect the presence of an array processor in communication with the audio bus and configure the audio bus to pass audio signals from the plurality of microphones to the array processor, wherein the array processor creates at least one output audio stream formed from a subset of audio signals detected by the plurality of microphones, the subset based upon a position of the module in a chain of modules.

In yet another embodiment, a modular array microphone system comprises a first microphone module and a second microphone module. Each of the first and second microphone modules comprises a housing, having a first end, a middle portion, a second end, and a length extending from the first end to the second end, an audio bus, and a plurality of microphones supported by the housing and generally dispersed across the length of the housing, each of the plurality of microphones in communication with the audio bus, wherein the plurality of microphones includes a first cluster of microphones proximate the first end, a second cluster of microphones proximate the second end and a third cluster of microphone proximate the middle portion.

In yet another embodiment, a modular array microphone system comprises a first microphone module connected to a second microphone module. Each of the first and second modules comprises a housing, having a first end, a middle portion, a second end, and a length extending from the first end to the second end, an audio bus, and a plurality of microphones supported by the housing and generally dispersed across the length of the housing, each of the plurality of microphones in communication with the audio bus. The plurality of microphones includes a first cluster of microphones proximate the first end, a second cluster of microphones proximate the second end and a third cluster of microphone proximate the middle portion. The second end of the first microphone module is connected to the first end of the second microphone module at a connection point to form a composite array microphone, the composite array microphone comprising a first composite cluster, a second composite cluster and a third composite cluster.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
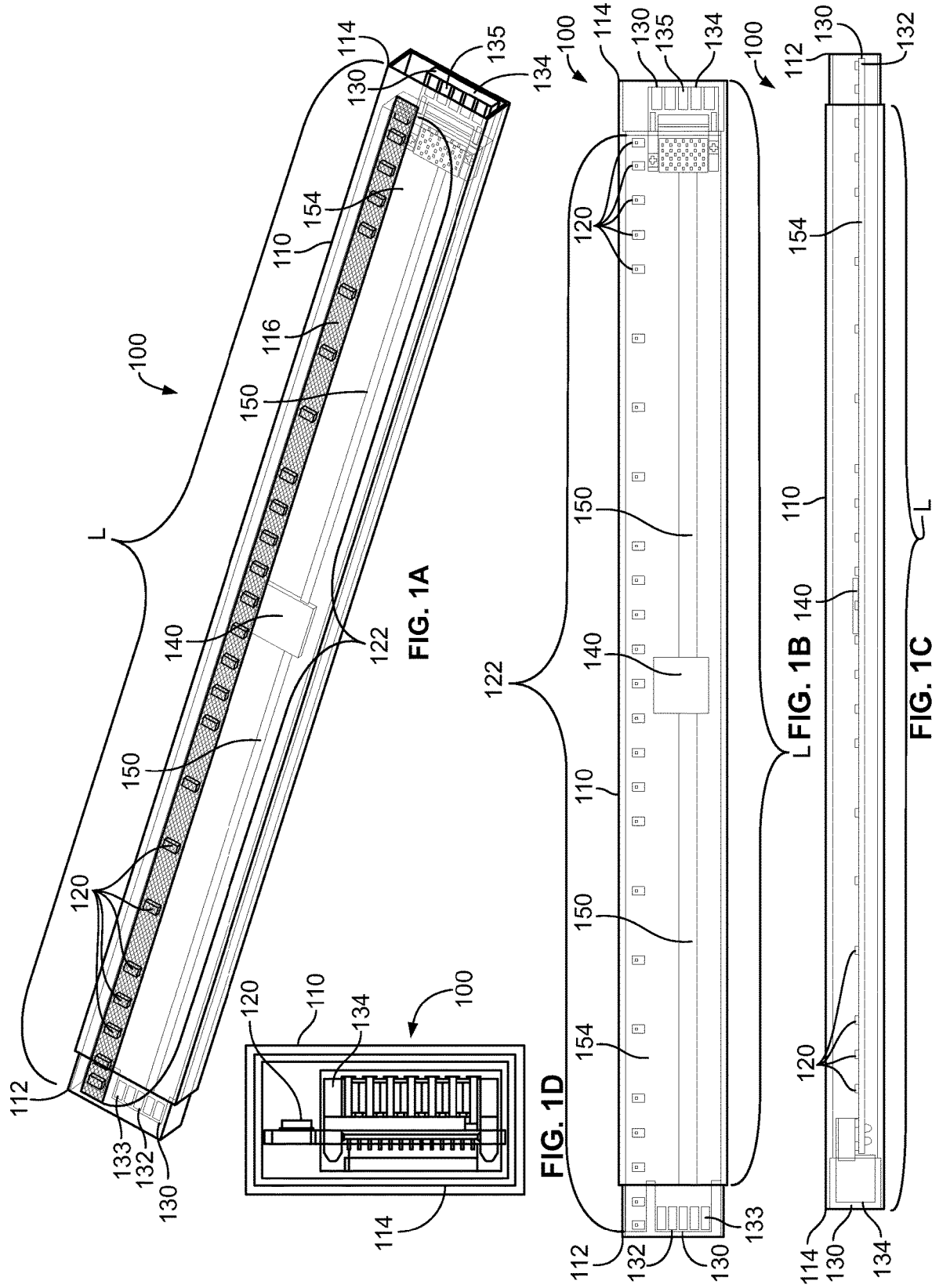
FIG. 1A is a perspective view of a microphone module according to an embodiment of the present invention.
FIG. 1B is top view of the microphone module of FIG. 1A.
FIG. 1C is a front view of the microphone module of FIG. 1A.
FIG. 1D is an end view of the microphone module of FIG. 1A.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

Turning to FIG. 1, an exemplary embodiment of a microphone module 100 for detecting sound from an external acoustic source according to the present invention is depicted, which may be any frequency of sound pressure, including, for example, an audio source. The microphone module 100 generally comprises an elongated housing 110 having a first end 112 and a second end 114. The microphone module 100 generally has a length (L) extending from the first end 112 to the second end 114. A plurality of microphones 120 arranged in an array 122 are supported by the housing 110 of the module 100. In an embodiment, the microphones 120 are mounted inside of and supported by the housing 110, but in alternative embodiments, the microphones 120 may be mounted on the exterior of the housing 110, partially within and partially outside of the housing 110, or in other manners such that the microphones 120 are structurally supported by the housing 110.

In the embodiment shown in FIGS. 1A-1C, a quantity of twenty-five (25) microphones 120 are arranged in an array 122 and mounted within the housing 110. To permit the microphones 120 of the module 100 to receive sound, one or more apertures 116 are formed into the housing 110 to allow sound to pass through the housing 110. In the embodiment depicted in FIG. 1A, a single slot-shaped aperture 116 is formed into the housing 110 of the module 100, and is optionally covered in a porous screen, as shown, to protect the microphones 120 and other internal components of the module 100. In other embodiments, greater numbers of apertures 116 may be formed in the housing 110 to permit sound from external sound sources to reach the microphones 120 supported by the housing 110 of the module 100. The apertures 116 may take on various forms, including slots, slits, perforations, holes, and other arrangements of openings in the housing 110.

In the embodiment of FIG. 1, the microphones 120 are generally arranged in a linear fashion, forming a linear array 122 positioned along the length (L) of the microphone module 100. While the microphones 120 are generally positioned along the length (L) of the module 100, they need not be positioned along a straight line, and can be positioned in various configurations throughout the housing 110 of the module 100. In an embodiment, the microphones 120 are generally positioned transverse to the length (L), and may be positioned proximate the aperture 116 in the housing 110 to detect sounds from external sources outside of the module 100. The microphones 120 need not be parallel to one another, but in an embodiment, are preferably positioned transverse to the length (L) of the housing 110.

The microphones 120 may be directional microphones, which are positioned in a certain orientation with respect to the aperture 116 to detect an audio source outside of the housing 110. Alternatively, the microphones 120 may be non-directional, or omni-directional microphones, which need not be positioned in a particular manner relative to the aperture 116 or housing 110, so long as acoustic waves can penetrate the housing 110 via the aperture 116 and reach the microphones 120. In other embodiments, other arrays 122 comprising alternative geometric arrangements of microphones 120 may be utilized. For example, the array 122 may comprise microphones 120 arranged in circular or rectangular configurations, or having nested concentric rings of microphones 120 across a plane. The length of the housing 110 need not be the largest dimension of the module 100, but rather can be any dimension of the module 100 along which the microphones 120 are positioned. Thus, in alternative embodiments, the layout and arrangement of the microphones 120 may be any variety of patterns, including two-dimensional and three-dimensional arrangements of microphones 120 within the housing 110. These arrangements can include arced, circular, square, rectangular, cross-shaped, intersecting, parallel or other shaped arrangements of microphones 120.

The microphone module 100 includes a module processor 140 and an audio bus 150, both of which are positioned within the housing 110 of the microphone module 100 in the embodiment depicted in FIG. 1A. The audio bus 150 serves to receive audio signals from the plurality of microphones 120 and to carry or transmit such audio signals along the bus 150 to other connected devices. In this way, the audio bus 150 is in communication with the plurality of microphones 120. The audio bus 150 may comprise a plurality of bus channels 152 (see FIG. 2) which carry the audio signals of the audio bus 150 as described herein. The module processor 140 is a local on-board processor which is in communication with the plurality of microphones 120 and the audio bus 150. The module processor 140 performs a variety of functions in enabling communications among the various components of the microphone module 100, as described herein.

The microphone module 100 may further include one or more connectors 130, supported by the housing 110 of the module 100. In the embodiment shown in FIG. 1, the microphone module 100 includes a first connector 132 proximate the first end 112 of the housing 110 and a second connector 134 proximate the second end 114 of the housing 110. The connectors 132, 134 are in electrical communication with the audio bus 150 such that when external devices are connected to the connectors 132, 134, audio signals carried by the audio bus 150 may be transmitted to and received from such external devices (not shown).

In various embodiments, the connectors 130 may be both mechanical and electrical connection devices, as described herein. For example, the connectors 130 may both mechanically connect one module 100 to another module 200 (for example, as described with reference to FIG. 5). At the same time, the connectors 130 complete electrical connections between connected modules 100,200, as described in greater detail herein. The connectors 130 may take on a variety of different electrical interfaces, including for example, digital parallel/serial interfaces, analog parallel/serial interfaces, and other wired interfaces. Moreover, the connectors 130 may be wireless interfaces or connection points whereby electrical signals are transmitted to and received from connected external devices wirelessly. In such case, the wireless connectors 130 may be contained completely within the housing 110 of the microphone module 100 rather than being visible on the exterior of the housing 110 as depicted in FIG. 1.

The connectors 130 permit the microphone module 100 to be connected to one or more other microphone modules in serial or "daisy-chained" fashion, with one module's end being connected to the next module, as explained herein. This connectivity supports the ability of the audio bus 150 to carry audio from both the microphones 120 on board of the microphone module 100 as well as audio from any other microphone modules downstream of the module 100 and connected to the module 100 via the connectors 130. Similarly, the connectors 130 allow the audio bus 150 to transmit audio signals upstream to any other devices (such as another microphone module) connected via the connectors.

In an embodiment, the module processor 140 is a field-programmable gate array, or FPGA device. However, in other embodiments, the module processor 140 may take on various other forms of processors capable of controlling inputs and outputs to the module 100 and controlling the audio bus 150. For example, the module processor 140 could be one of many appropriate microprocessors (MPU) and/or microcontrollers (MCU). The module processor 140 could further comprise an application specific integrated circuit (ASIC) or a customized hardware ASIC such as a complex programmable logic device (CPLD). The module processor 140 could further comprise a series of digital/analog bus multiplexers/switches to re-configure how inputs and outputs to the module 100 are connected.

The microphones 120 in the module 100 may be any suitable type of transducer that can detect the sound from an audio source and convert the sound to an electrical audio signal. In a preferred embodiment, the microphones 120 are micro-electrical mechanical system (MEMS) microphones. In other embodiments, the microphones 120 may be condenser microphones, balanced armature microphones, electret microphones, dynamic microphones, and/or other types of microphones.

In certain embodiments, the microphone module 100 may be able to achieve better performance across the voice frequency range through the use of MEMS microphones. MEMS microphones can be very low cost and very small sized, which allows a large number of microphones 120 to be placed in close proximity in a single microphone array. Thus, given the very small sizes of available MEMS microphones, larger numbers of microphones 120 can be included in the module 100, and such greater microphone density provides improved rejection of vibrational noise, as compared to existing arrays. Moreover, the microphone density of the array can permit varying beam width control, whereas existing arrays are limited to a fixed beam width. In yet other embodiments, the microphone module 100 can be implemented using alternate transduction schemes (e.g., condenser, balanced armature, etc.), provided the microphone density is maintained.

Further, by using MEMS microphones 120 in the array in the module 100, processing of audio signals may be conducted more easily and efficiently. Specifically, because some MEMS microphones produce audio signals in a digital format, the module processor 140 need not include analog-to-digital conversion/modulation technologies, which reduces the amount of processing required to mix the audio signals captured by the microphones 120. In addition, the microphone array may be inherently more capable of rejecting vibrational noise due to the fact that MEMS microphones are good pressure transducers but poor mechanical transducers, and have good radio frequency immunity compared to other microphone technologies.

In an embodiment, the microphones 120 can be coupled to, or included on, a substrate 154 mounted within the housing 110 of the module 100. In the case of MEMS microphones, the substrate 154 may be one or more printed circuit boards (also referred to herein as "microphone PCB"). For example, in FIG. 1, the microphones 120 are surface mounted to the microphone PCB 154 and included in a single plane. In other embodiments, for example, where the microphones 120 are condenser microphones, the substrate 154 may be made of carbon-fiber, or other suitable material.

The other components of the module 100 may also be supported by or formed within the substrate or PCB 154. For example, the module processor 140 may be supported by the PCB, and placed in electrical communication with the microphones 120, the audio bus 150 and the connectors 130 via electrical paths formed in the PCB 154. The audio bus 150, and the various bus channels 152 comprising the audio bus 150 may also be formed partially or entirely within or upon the PCB 154. Moreover, the connectors 130 may be supported by the PCB 154, or may be integrally formed within or upon the PCB 154.

For example, as seen in FIG. 1, the first connector 132 at the first end 112 of the module 100 may comprise an electrical connector comprising a plurality of electrical pads 133. Similarly, the second connector 134 at the second end 114 of the module 100 may comprise an electrical connector comprising a plurality of electrical contacts 135. As is described in reference to FIG. 5, when the first end 212 of a second module 200 is inserted into and coupled with the second end 114 of a first module 100, such that their connectors 232, 134 are connected, the electrical pads (not shown) of the second module 200 come into electrical contact with the electrical contacts 135 of the first module 100, completing the electrical connection between the two modules 100,200. The electrical pads of the second module 200 may be similar to the electrical pads 133 of the first module 100. In an embodiment, either or both of the electrical pads 133 and contacts 135 may be formed into the PCB, such as the first connector 132 in FIG. 1.

Figure 2:
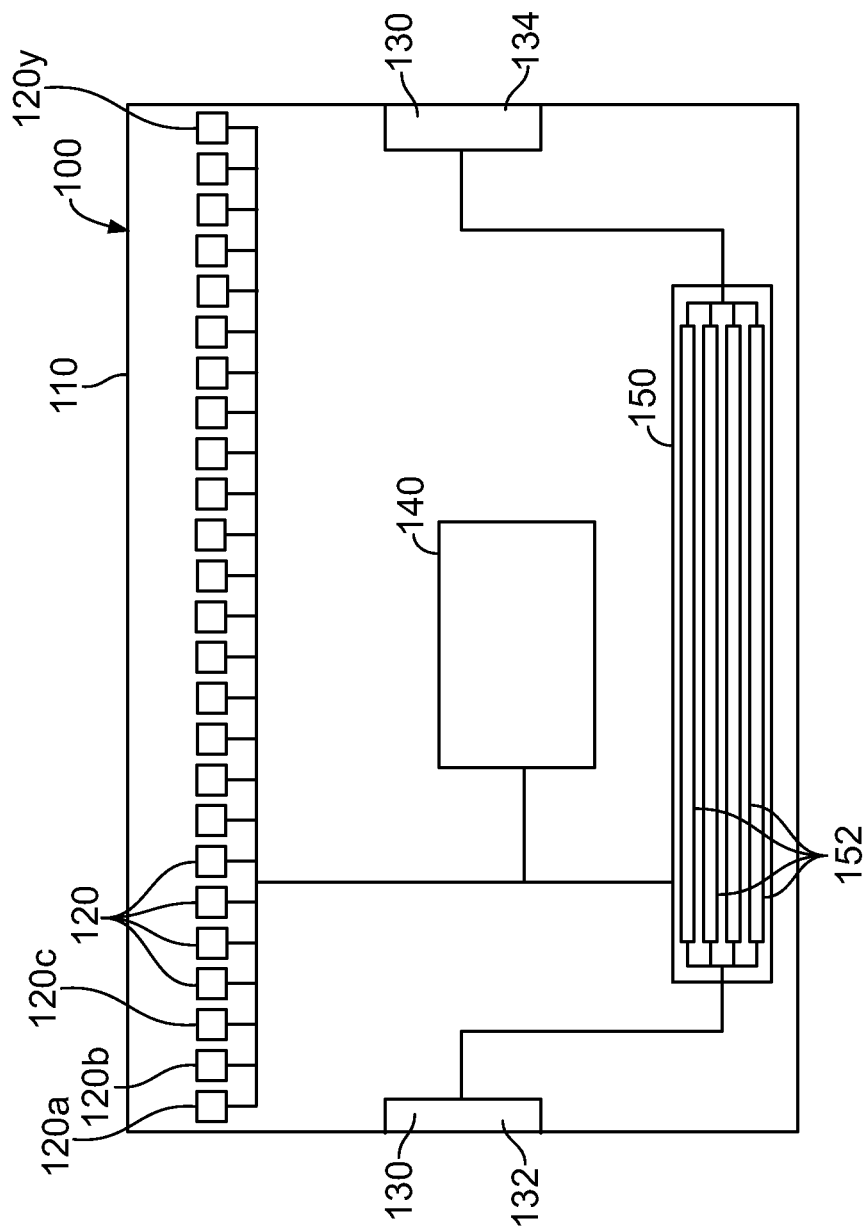
FIG. 2 is a block diagram of the microphone module of FIG. 1A.

In an embodiment, the audio bus 150 comprises a time division multiplex bus (or TDM bus). The TDM bus has a plurality of audio channels 152, which in the embodiment shown in FIG. 2 is eight audio channels 152. In alternative embodiments, greater or fewer audio channels 152 may be provided on the audio bus 150, depending on the quantity of microphones 120 provided in the module 100, and the applications in which the module 100 is contemplated to be used.

Using time division multiplexing, as is known, allows for transmitting and receiving independent signals over a common signal path. In TDM, a plurality of audio signals, or bit streams are transferred appearing simultaneously as sub-channels in one communication channel, but are physically taking turns on the communication channel. Thus, by using a TDM bus as the audio bus 150, the audio bus 150 can have fewer audio channels 152 than the number of audio inputs. For example, as shown in FIGS. 1 and 2, the TDM audio bus 150 has eight audio channels 152, which are in communication with twenty-five (25) microphones 120, as well as any downstream audio from any additional microphone modules connected via the connectors 130. In the embodiment shown in FIGS. 1 and 2, the TDM bus 150 has eight audio channels 152 each of which can carry up to twenty-one (21) microphone signals per channel, for a total of up to 168 microphones, allowing as many as six (6) microphone modules 100 to be serially connected or "daisy-chained" together and connected to a single continuous audio bus. In other embodiments, depending on the number of microphones 120 present on the module 100, and the configuration of the TDM bus 150, even more modules 100 can be serially connected to one another.

A block diagram of the microphone module 100 of FIG. 1 is depicted in FIG. 2. As described with reference to FIG. 1, the module 100 includes a housing 110 in which the various components of the module 100 are housed. A plurality of microphones 120a-y in the module are in communication with a module processor 140, and an audio bus 150. The audio bus 150 is in communication with a pair of connectors 130, which allow the modules 100 to be daisy-chained together in serial, end-to-end fashion. The audio bus 150 comprises a plurality of audio channels 152 over which audio signals from the microphones 120 of the module 100, as well as audio signals received from any downstream connected modules via the connectors 132,134 is transmitted.

Figure 3A:
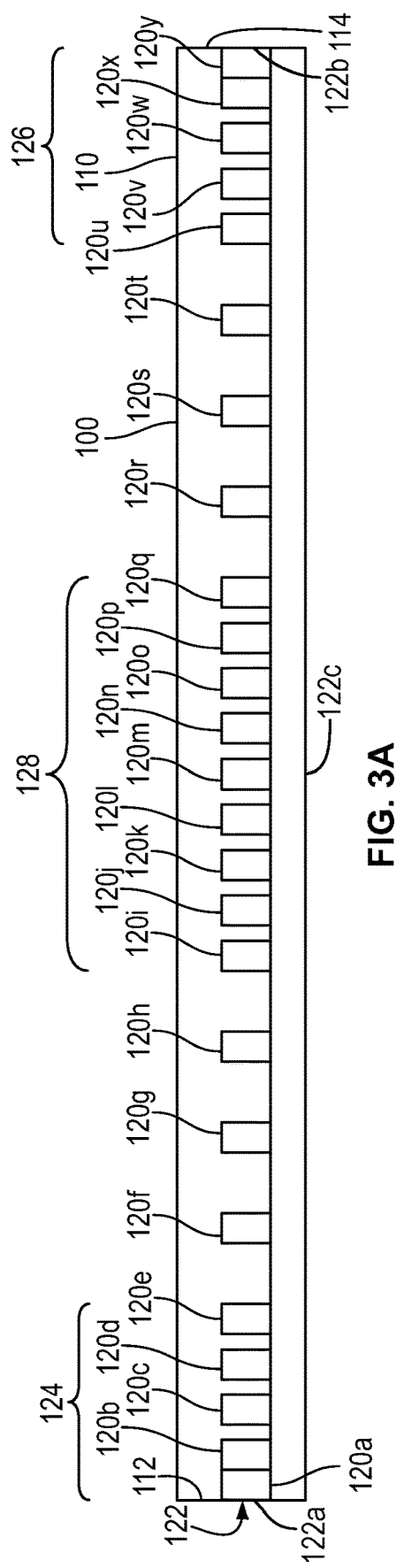
FIG. 3A is a schematic view of a single microphone module of the present invention depicting the spacing of the microphones within the module.

Turning to FIG. 3A, a preferred arrangement of microphones 120 in a linear array 122 for use within a microphone module 100 is depicted. The linear array 122 comprises twenty-five (25) microphones 120a-y, which are spaced from one another in the geometry depicted in FIG. 3A. In this embodiment, the microphones 120a-y are positioned generally along the length (L) of the array. In some embodiments, the microphones 120a-y are spaced and positioned along the array 122 in a harmonic nesting fashion to support directional sensitivity to audio of varying frequency bands. Using harmonic nesting techniques, the microphones 120a-y can be used to cover a specific frequency bands within a range of operating frequencies. Harmonic nesting is more fully described in U.S. patent application Ser. No. 14/701, 376 filed Apr. 30, 2015, now U.S. Pat. No. 9,565,493, assigned to Shure Acquisition Holdings, Inc., which is hereby incorporated in its entirety as if fully set forth herein.

In a preferred embodiment, a group of five microphones 120a-e are positioned in close proximity to one another near a first end 122a of the array 122 to form a first cluster 124 of microphones 120. Similarly, a second group of five microphones 120u-y are positioned in close proximity to one another near a second end 122b of the array 122 to form a second cluster 126 of microphones 120. In similar fashion, a third cluster 128 of microphones 120 is formed by a group of nine microphones 120i-q positioned in close proximity to one another near a center 122c of the array 122. This arrangement of clusters 124, 126, 128 near the ends 122a,b and center 122c of the array 122 supports the ability of the microphone module 100 to be "modular"—or connectable in series or daisy-chained fashion with other like microphone modules to form a microphone array of varying or selectable length, as explained herein.

The clusters 124, 126, 128 support the ability of the microphone module 100 to form steerable microphone beams so as to use the microphones 120 of the module 100 to transmit desired directional audio and reject undesired audio outside of the microphone beams. Specifically, depending on the frequency range of the audio which is sought to be captured by a microphone array 122, it is beneficial to have a cluster 128 at the center 122c of the array 122. However, if the module 100 were to only include a cluster 128 at the center 122c of the array 122, but not at the ends 122a,b of the array 122, difficulties would arise when connecting the modules 100 in serial fashion as contemplated herein.

Figure 3B:
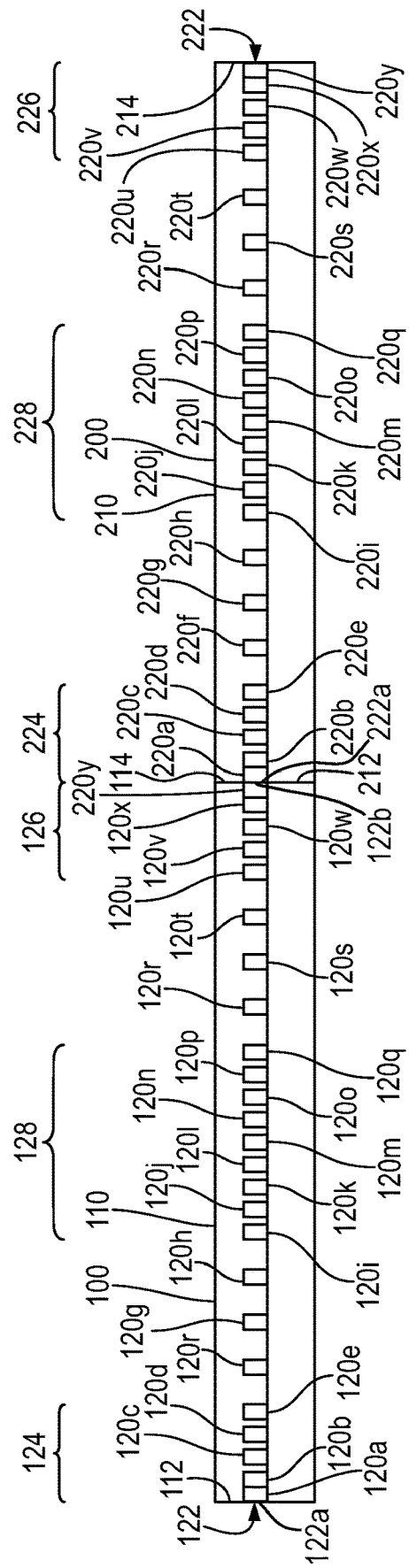
FIG. 3B is a schematic view of two connected microphone modules of the present invention depicting the spacing of the microphones within the modules.

For example, a system of two connected modules 100, 200 is depicted in FIG. 3B. The module 200 may be similar to the module 100, and include a first end 212, a second end 214, and a plurality of microphones 220a-y. When the two modules 100,200 are connected or daisy-chained in serial linear fashion as shown in FIG. 3B, a composite linear array 122,222 is formed by the arrays 122,222 of the pair of connected modules 100,200. Since each array 122, 222, includes clusters 124,126,224,226 located on the physical ends of the arrays 122,222, when the arrays 122,222 are combined (through the unification of the two modules 100,200), the unified array 122,222 maintains a collection of clusters 124,226 at the ends of the system. Moreover, a combined cluster 126,224 remains in the middle of the combined arrays 122,222, thereby maintaining a cluster of microphones 120 in the center of the combined array 122, 222. Therefore, the inclusion of clusters 124,126 at the ends of the module 100 as well as a cluster 128 in the middle of the module 100 supports daisy chaining the modules 100, 200 together while maintaining a high level of performance.

Figure 3C:
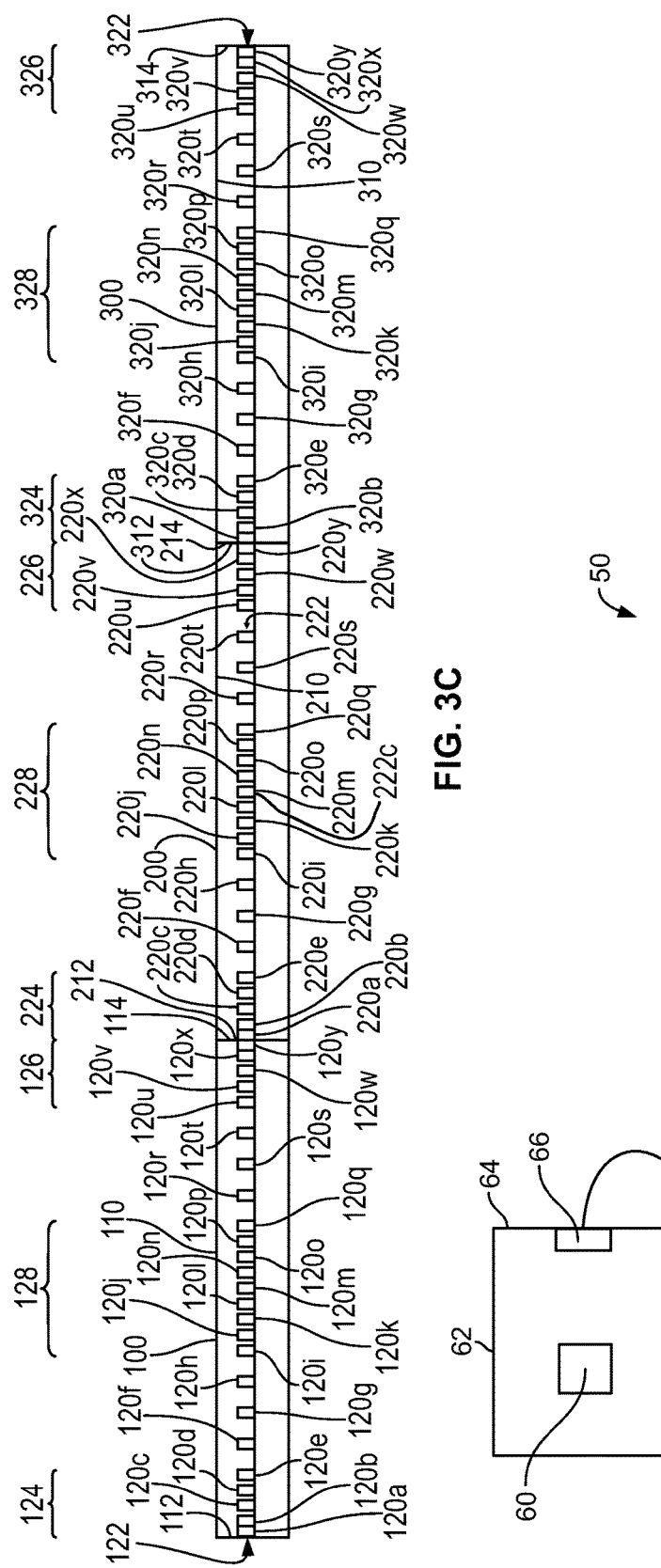
FIG. 3C is a schematic view of three connected microphone modules of the present invention depicting the spacing of the microphones within the modules.

The location of the clusters is further demonstrated in a system having three modules, as seen in the system depicted in FIG. 3C. In FIG. 3C, a composite array 122,222,322 is formed by serial connection of three microphone modules 100,200,300. The module 300 may be similar to the modules 100,200, and include a housing 310, a first end 312, a second end 314, and a plurality of microphones 320a-y. In such a configuration, the cluster 228 of microphones 220 in the center 222c of the array 222 of the second module 200 would also lie in the overall center of the composite array 122,222,322 formed by the three modules 100,200,300. This would be the case for any system having an odd number of modules formed in linear fashion. The module 300 may include other clusters 324, 326, 328. The module 300 may also include a first connector 332 and a second connector 334.

Since the microphone module 100 is designed to be used in systems of varying numbers of modules, it is important that the module 100 be configured to support connectivity of any number of modules as described above—that is, having a cluster 128 of microphones 120 in the center 122c of the array 122 (as well as end clusters on the array 122) regardless of whether odd or even numbers of modules 100 are serially connected or daisy chained in linear fashion. In an embodiment, this is accomplished by the inclusion of the first and second clusters 124,126 at the first and second ends 122a,122b of the array 122. These end clusters 124,126 come together to form a cluster at the center of a composite array formed from even numbered quantities of modules 100.

For example, returning to FIG. 3B, two microphone modules 100,200 are connected together in serial fashion to form a composite linear array 122,222. By positioning the first and second modules 100,200 in physical proximity to one another, the second end 114 of the housing 110 of the first module 100 is proximate the first end 212 of the housing 210 of the second module 200. In this way, the housings 110,210 effectively form a single system of microphones 120,220, formed by the sets of microphones 120,220 of the individual modules 100,200 forming the system. This further results in the second end 122b of the array 122 of the first module 100 being adjacent to the first end 222a of the array 222 of the second module 200, effectively forming a single, linear composite array 122,222 comprising the two arrays 122,222 of the two modules 100,200. The inclusion of the end clusters 124,126,224,226 on the arrays 122,222 of the modules 100,200 ensures that a cluster of microphones 120,220 is formed when two modules 100,200 are connected in this fashion. Specifically, as seen in FIG. 3B, the second cluster 126 of microphones 120 on the first module 100 is proximate the first cluster 224 of microphones 220 of the second module 200, such that the composite array 122,222 now includes a center cluster of microhones 120,220 formed by these two clusters 126,224. Similarly, in any system including an even number of modules 100 connected together in serial, linear fashion, the system will always include a cluster of microphones 120 in the center of the composite array 122,222 formed by the modules 100,200 in the system.

Figure 4:
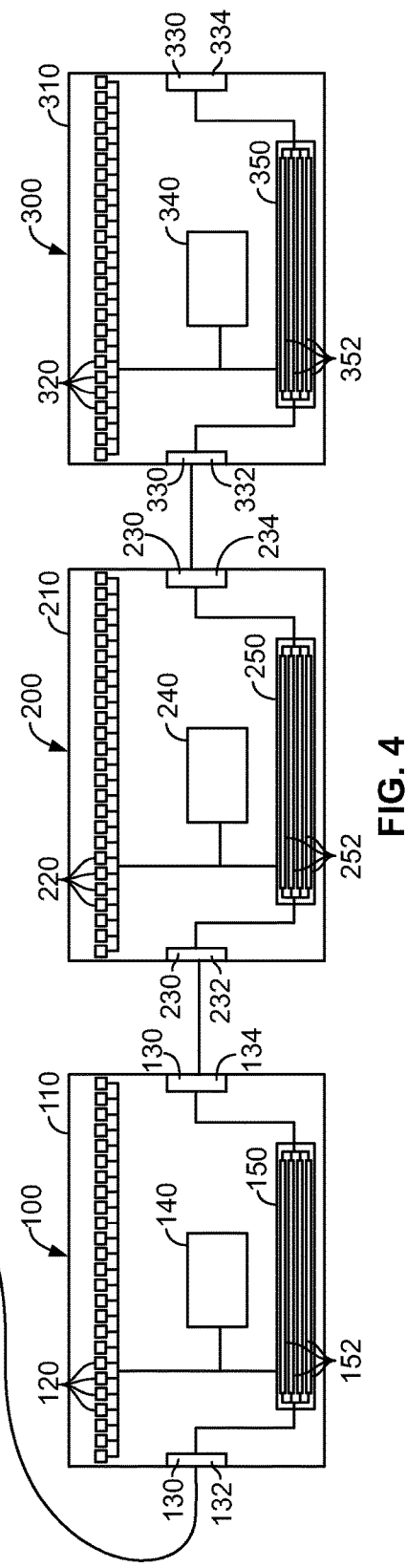
FIG. 4 is a block diagram of a system of the present invention including a control module and three microphone modules.

Turning to FIG. 4, a block diagram of an embodiment of a modular array microphone system 50 is depicted. The system 50 includes one or more microphone modules 100, such as the modules 100,200,300 described in reference to FIGS. 1 and 2. In the embodiment shown, the system 50 includes three microphone modules 100,200,300. The system 50 further includes an array processor 60 which is in communication with the modules 100,200,300 of the system 50. The array processor 60 acts to control the system 50, and works in conjunction with the module processors 140, 240, 340 of the connected modules 100,200,300.

In an embodiment, such as the one shown in FIG. 4, the system includes a control module 62, which may be a separate piece of hardware from the microphone modules 100,200,300 in the system 50. The control module 62 comprises a housing 64 which contains the components of the control module 62. The array processor 60 may be a component of the control module 62 and located within the control module housing 64. The control module 62 may include a connector 66 for placing the control module 62 in electrical connection with the other components of the system 50, such as the microphone modules 100,200,300, for example through the use of an appropriate cable connection.

In alternative embodiments, such as the embodiment shown and described with reference to FIG. 6, the array processor 60 may be on board of one or more of the microphone modules 100,200,300, such that a separate control module 62 is unnecessary. In such embodiments, each microphone module 100,200,300 may include an array processor 60, such that when the modules 100,200,300 are interconnected as described herein, the on board array processors 60 will be in communication with one another via the audio bus 150, or other electrical connections between the modules 100,200,300. Once interconnected, one or more of the array processors 60 of the system 50 may perform the system control and processing functions as described herein with reference to the array processor 60.

Figure 5:
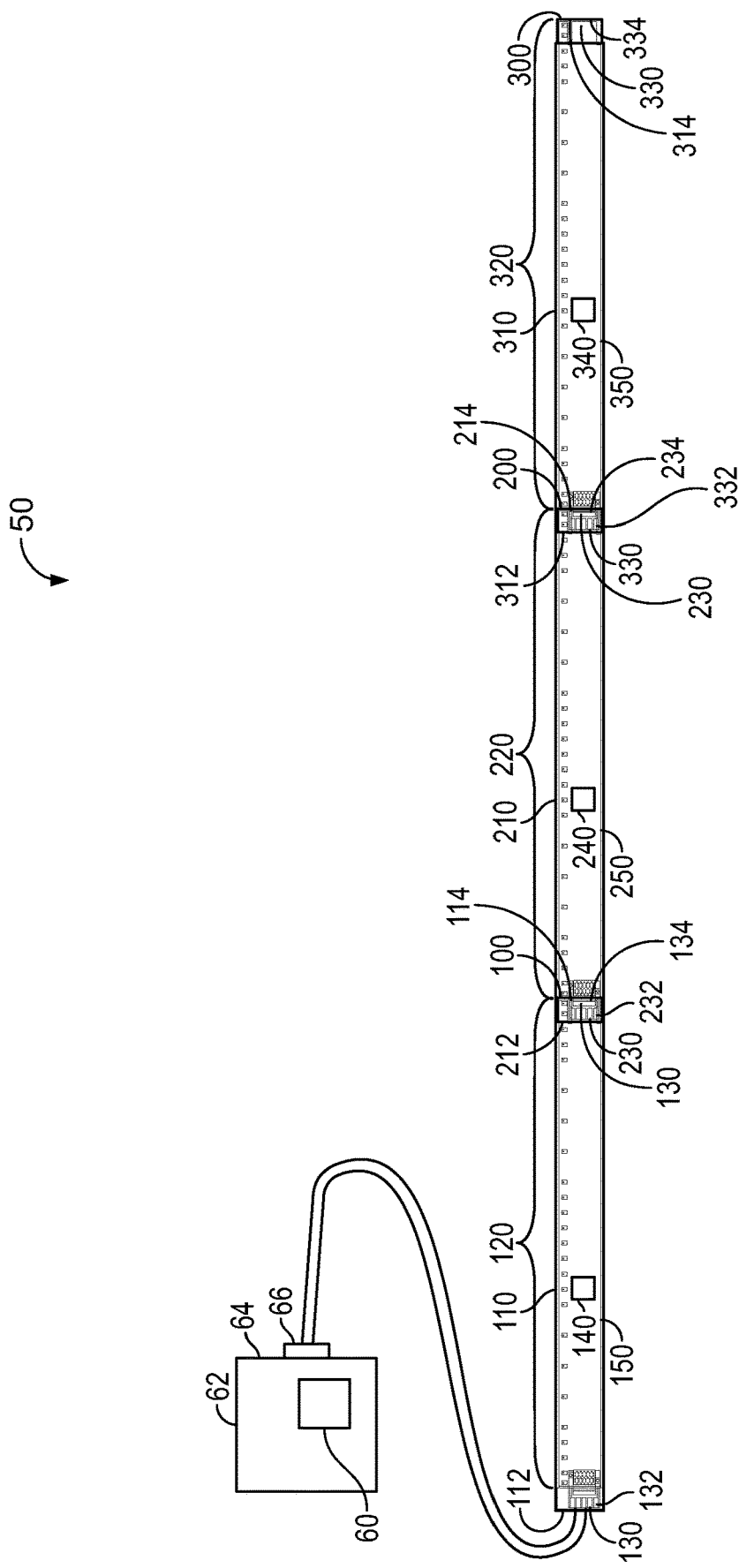
FIG. 5 is a top view of the system of FIG. 4, depicting a system including a control module and three microphone modules.
Figure 6:
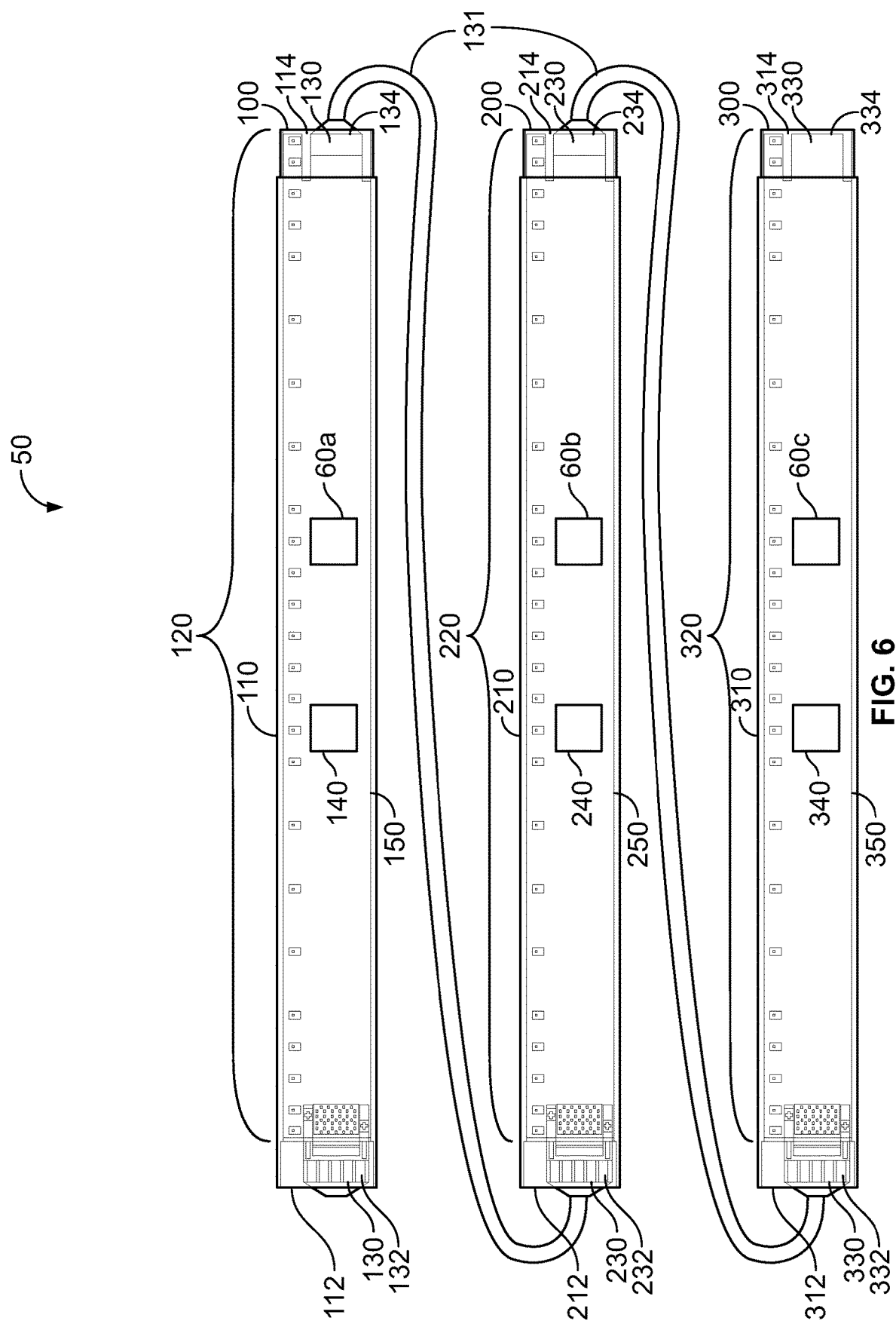
FIG. 6 is a top view of an alternative embodiment of the system of FIG. 5.

In an embodiment, a plurality of modules 100,200,300 may be connected in serial fashion via their respective connectors 130,230,330, and in turn, connected to the array processor 60, via the connector 66 on the control module 62, as seen in FIGS. 4-6. More specifically, an electrical connection is made from the connector 66 of the control module 62 to the first connector 132 of the first microphone module 100. To "daisy chain" or serially connect the second microphone module 200, an electrical connection is made from the second connector 134 of the first module 100 to the first connector 232 of the second module 200. Similarly, a third microphone module 300 can be added to the chain by completing an electrical connection from the second connector 234 of the second microphone module 200 to the first connector 332 of the third module 300. The system 50 can be increased to include additional microphone modules 100,200,300 connected in similar manner using the available connections 130,230,330 on the modules 100,200,300.

Once connected, the array processor 60 controls the system 50 by interacting with the audio bus 150,250,350 passing through the connected microphone modules 100, 200,300. The audio buses 250, 350 may be similar to audio bus 150 and may comprise a plurality of bus channels 252, 352, respectively, which carry the audio signals of the audio buses 250, 350. In this way, the array processor 60 acts as a master controller of the system 50. The module processors 140, 240,340 support the system 50 by relaying information to and from the array processor 60, and assisting in configuring the system 50 operationally. Once connected, the audio busses 150, 250,350 of the various modules 100,200, 300 work in concert to form a composite audio bus for the system 50.

For example, in an embodiment such as the one shown in FIG. 4, once the system 50 components are connected and powered up, the module processors 140,240,340 work in conjunction with the array processor 60 to determine and identify the connected components in the system 50. In an embodiment, the system 50 self detects, realizes, and shares information about the connected components of the system—including the quantity and connection order of the microphone modules 100,200,300 in the system 50. Thus, each module processor 140,240,340 can determine what is connected to the module 100,200,300 on which it resides, and the interconnected modules 100,200,300 can share that connection information with one another, and with the array processor 60.

In an embodiment, depicted in FIG. 4, for example, the module processors 140,240,340 can determine the connection configuration of the microphone module 100,200,300 on which the processor 140,240,340 resides. In the embodiment shown, each microphone module 100,200,300 will be detected as being one of five available connection configurations. For example, if the first microphone module 100 was not connected to either a control module 62 or array processor 60, nor was it connected to any other microphone modules 200,300, its module processor 140 could detect that the microphone module 100 was in a "Stand Alone" configuration—and the module 100 could be placed in operation in such a configuration. If the microphone module 100 was connected to a control module 62, but not to any other microphone modules 200,300, the module processor 140 could detect that it was in a "Single Block with Array Processor" configuration, comprising a system 50 of just an array processor 60 and one connected module 100.

If the microphone module 100 was connected to a control module 62, and at least one other microphone module 200,300, the module processor 140 could detect that it was in a "First Block" configuration (signifying that the module 100 was the first in chain of a plurality of modules 100,200, 300 connected to the control module 62). If a microphone module 200 was neither the first nor the last module 100,300 in a chain of modules 100,200,300 connected to a control module 62, the module processor 240 would detect that the microphone module 200 was in a "Middle Block" configuration. Finally, if a microphone module 300 was the last module 300 in a chain of modules 100,200,300 connected to a control module 62, the module processor 340 would detect that the microphone module 300 was in a "Last Block" configuration. Thus, the self-detection capabilities of the system 50 allow each module 100,200,300 in the system to determine which of the five configurations it is in (Stand Alone, Single Block with Array Processor, First Block, Middle Block, or Last Block), and to share such configuration information with the other modules 100,200,300 of the system 50, as well as the array processor 60, to configure the system 50.

Through interactions between one or more of the array processor 60 and the microphone module processors 140, 240,340, the system 50 is intelligent so as to sense and determine its configuration. For example, in the three module system depicted in FIG. 4, after the self detection processes executes and completes as described above, the array processor 60 and each of the module processors 140,240,340 will know the quantity of connected microphone modules 100,200,300 (in this case three), and a connection order of the connected microphone modules 100,200,300 (in this case, the first module 100 is connected first, the second module 200 is connected second, and the third module 300 is connected third). One or more of the processors 60,140,240,340 will configure the modules 100, 200,300 so that the system 50 places the first module 100 in "First Block" mode or configuration, places the second module 200 in a "Middle Block" mode, and places the third module 300 in a "Last Block" mode.

These configuration steps set up the system 50 to work in a unified manner, and allow the module processors 140,240, 340 to configure each module 100,200,300 to properly populate the audio bus 150,250,350 with audio signals from both the on board microphones 120,220,320 of the modules 100,200,300 as well as any audio from downstream modules 200,300. For example, the third module 300, being in "Last Block" mode, knows that it is not going to receive any audio signals from any downstream modules, since no additional modules are connected to it. Therefore, the system 50 configures the audio bus 350 so as to populate the audio bus 350 with audio signals from its onboard microphones 320. The second module 200, being in "Middle Block" mode, knows that it is receiving audio signals from one or more downstream modules (in this case the third module 300). Therefore, the system 50 configures the audio bus 250 so as to populate the audio bus 250 with audio signals from both its onboard microphones 220 as well as audio signals from connected downstream modules, such as the third module 300. Similarly, the first module 100, being in "First Block" mode, knows that it is receiving audio signals from one or more downstream modules (in this case the second and third modules 200,300). Therefore, the system 50 configures the audio bus 150 so as to populate the audio bus 150 with audio signals from both the onboard microphones 120 as well as audio signals from connected downstream modules, such as the second and third modules 200,300.

In this way, the system 50, across the control module 62 and connected microphone modules 100,200,300, comprises a composite audio bus formed from the audio busses 150, 250,350 of the connected microphone modules 100,200,300. The composite audio bus carries all of the audio signals from the microphones 120,220,320 of the connected microphone modules 100,200,300, and passes those audio signals to the control module 62 where they can be processed and further transmitted by the array processor 60. Thus, in embodiments, the array processor 60 is also in communication with an output channel to transmit audio received by the array processor 60 via the composite audio bus 150,250,350. For example, the array processor 60 may be in communication with an output channel via a connection in the control module 62 that allows outbound audio to be further transmitted to an output device. For example, the output device may be one or more speakers for transmitting the sound, an audio amplifier, a telecommunications device for transmitting sound, etc. In a conferencing environment, the output channel may connect to local loudspeakers mounted in the environment for sound reinforcement. Or the output channel may connect to a teleconferencing bridge for transmitting audio to remote locations, for example, other users connected to a conference call.

As described herein, the modular aspect of the microphone modules 100 allow creation and configuration of various systems 50 using the modules 100 as "building blocks" for the system 50. In this way, the system 50 uses the modules 100 to form an "array of array microphones" by using the modular nature of each of the microphone modules 100,200,300 to form a customized microphone array, which depends on the number of the microphone modules 100, 200,300 which are connected together to form the system 50. The array processor 60 can then use audio signals from any and all of the microphones 120,220,320 in the system to perform flexible beam forming calculations, and form steerable microphone beams as described further herein.

Turning to FIG. 5, an example embodiment of the system 50 of FIG. 4 is depicted. As described, the three microphone modules 100,200,300 are connected and daisy chained together to form a single microphone array. The first module 100 is connected to the control module 62 via an electrical cable which connects the control module connector 66 to the first connector 132 of the first module 100. It should be understood that the electrical cable connecting the control module connector 66 and the first connector 132 need not directly connect the two connectors 66,132—but rather, one or more intermediate pieces of hardware, processing units, or cabling may exist in such connection, so long as signals can pass to and from the array processor 60 and the first module 100 such that the two are in communication.

The second connector 134 of the first module 100 is connected to the first connector 232 of the second module. Similarly, the second connector 234 of the second module 200 is connected to the first connector 332 of the third module 300. Thus, in the embodiment shown in FIG. 5, the modules 100,200,300 are connected mechanically and electrically to form a single array comprised of the three interconnected modules 100,200,300.

In an alternative embodiment depicted in FIG. 6, the various modules 100,200,300 of the system 50 may be electrically connected by various wires or cables 131. Thus, a first cable may be used to connect the second connector 134 of the first module 100 to the first connector 232 of the second module 200. Similarly, a second cable may be used to connect the second connector 234 of the second module 200 to the first connector 332 of the third module 300. The use of connecting cables, as shown, provides greater flexibility in mounting the modules 100,200,300 since in this embodiment, the modules 100,200,300 are not mechanically connected to one another, but rather are only electrically connected via the cables between their respective connectors 130,230,330. Thus, by using connecting cables of various lengths, the physical spacing of the modules 100,200,300 of the system 50 can be customized and controlled in the environment in which the system 50 is deployed. In these ways, the ability to connect or daisy chain the modules 100,200,300 allows designers and installers of such systems 50 to create custom length microphone arrays by employing different numbers of microphone modules 100,200,300 connecting them in the ways described herein.

Additionally, in the embodiment shown in FIG. 6, the array processor(s) 60 which control the system 50 may be included on board of the various modules 100,200,300 of the system 50 (as opposed to in a separate hardware control module 62 like other embodiments described herein). Thus, in FIG. 6, each of the microphone modules 100,200,300 includes an array processor 60a,60b,60c. Turning to the first module 100, the array processor 60a is in communication with the other components of the module 100, including the module processor 140, the audio bus 150, the connectors, 130,132,134, and the microphones 120. The other modules 200,300 are similarly configured. Thus, the various array processor 60a,60b,60c may work together to perform system level control and processing in a manner similar to the array processor 60 in FIG. 5. In the embodiment in FIG. 6, the system 50 may configure itself such that one of the array processors 60a,60b,60c is a "master" array processor, and controls the system level processing of the system 50. Alternatively, a plurality, or all of the array processors 60a,60b,60c may handle the system level processing demands, as described herein.

In an embodiment of the invention, the system 50 must compensate for time shifts in the various audio signals received by the array processor 50 via the composite audio bus 150,250,350. Thus, because the various microphones 120,220,320 of the various connected microphone modules 100,200,300 of a system 50 are receiving audio at the same time, but transmitting such audio to the array processor 60 over differing lengths of the audio bus 150,250,350, the audio signals received by the microphones 120,220,320 may arrive at the array processor 60 with varying latencies and delays. Thus, the system 50 needs to account for the varying latencies of the received audio signals from the microphones 120,220,320 of the modules 100,200,300 in the system 50. In an embodiment, the array processor 60 performs a time alignment process to synchronize the audio received from the various microphones 120,220,320 of the modules 100, 200,300. This prevents undesirable effects such as echo or noise as the array processor 60 further transmits the audio signals of the system 50 to output devices. The time alignment process, or synchronization, can be performed by the array processor 60, on a system level. Alternatively, the time alignment process can be performed by one or more of the module processors 140,240,340 of the modules 100,200,300 of the system. Or the processors 60,140,240,340 may time align the audio signals by working cooperatively. In an embodiment, the system 50 may encode the audio signals with time stamp information when the audio signals are transmitted via the audio bus 150,250,350, and use such time stamp information to time align the audio signals.

Figure 7:
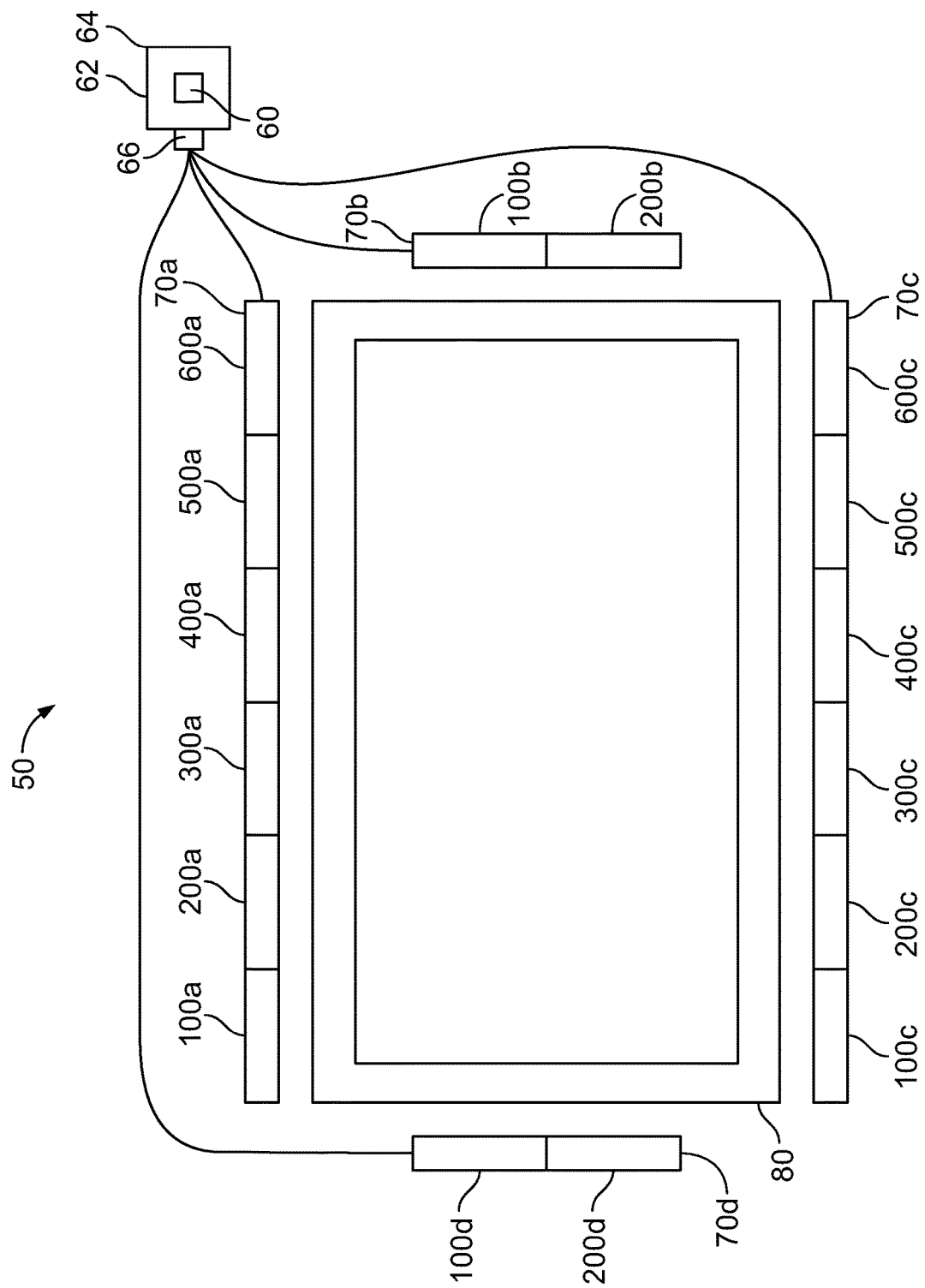
FIG. 7 is a front view of an example implementation of a system of microphone modules according to an embodiment of the present invention.

Turning to FIG. 7, an alternative embodiment of a system 50 including a plurality of microphone modules 100 is depicted. In this embodiment, one or more modules 100 are connected in banks 70a,b,c,d, with each bank 70a,b,c,d being connected to a central control module 62, specifically via the connector 66 of the module 62. It should be understood that the connector 66 may be a single electrical connector or connection point, or alternatively may comprise a plurality of connectors or connection points used to connect the various banks 70a,b,c,d as described herein.

As seen in FIG. 7, in a particular application in a conferencing environment, four banks 70a,b,c,d of microphone modules 100,200,300,400,500,600 are connected around the periphery of a wall mounted television 80. The first bank 70a is mounted above the television 80, and comprises six modules 100a,200a,300a,400a,500a,600a, connected in a daisy chained fashion as described herein. The first module 100a is connected to the control module 62 as described with reference to FIGS. 4-6. Similarly, a second bank 70b of modules is positioned along a right edge of the television 80. The second bank 70b comprises two modules 100b,200b connected in a daisy chained fashion with the first module 100b connected to the control module 62. A third bank 70c of modules is mounted along a bottom edge of the television 80. The third bank 70c comprises six modules 100c,200c, 300c,400c,500c,600c, with the first module 100c connected to the control module 62. Finally, a fourth bank 70d of modules is positioned along a left edge of the television 80. The fourth bank 70d comprises two microphone modules 100d,200d connected in a daisy chained fashion with the first module 100d connected to the control module 62.

Therefore, the system 50 depicted in FIG. 7 comprises a plurality of banks 70a,b,c,d connected to a central control module 62 having an array processor 60. Each of the banks 70a,b,c,d comprises a plurality of modules 100,200,300,400, 500,600. All of the modules 100 of the various banks 70a,b,c,d are under the control of the central control module 62 as described herein. Therefore, the flexibility of the system 50 is a valuable asset to designers and installers of such systems 50 in that the length of the various banks 70a,b,c,d can be customized with differing numbers of modules 100 in each bank 70a,b,c,d, and any of number of banks 70a,b,c,d can be utilized to create systems 50 having appropriate placement of microphone arrays in a variety of environments where sound is to be captured and transmitted by the system 50. The various arrangements of modules 100 in banks 70a,b,c,d as depicted in FIG. 7 allows for highly customizable solutions to be provided in the field with quantities of a single variety of array module 100, making such systems 50 desirable for ease of installation and design. Thus, the system 50 can be configured to comprise one chain of serially connected modules 100,200,300—such as the system depicted in FIGS. 4-6. Or the system 50 can be configured to comprise multiple chains of serially connected modules, arranged in banks 70a,b,c,d, such as the system 50 depicted in FIG. 7.

Figure 8A:
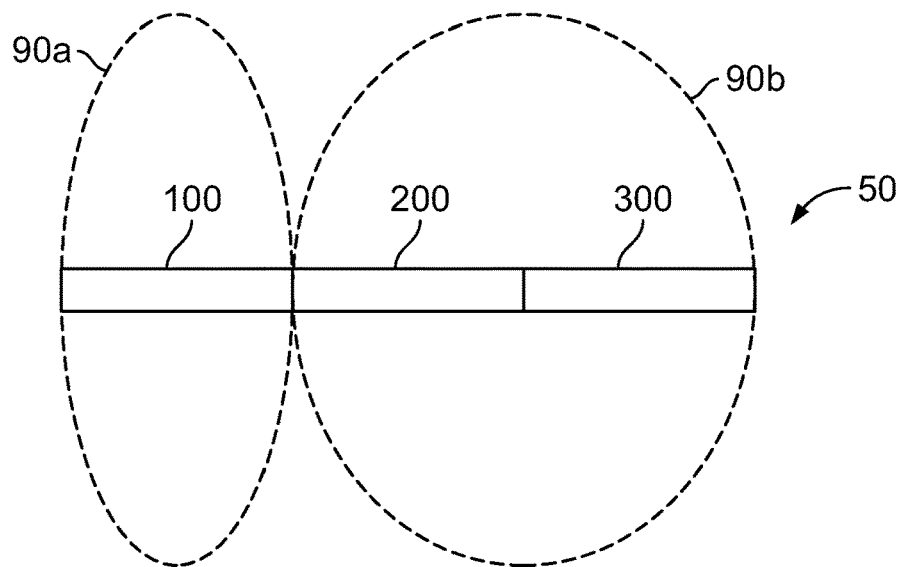
FIG. 8A is a top view of a system of microphone modules according to an embodiment of the present invention in which the system forms directional beams for picking up audio within an environment.

Systems 50 such as the one depicted in FIGS. 1-7 and described in relation to the other figures, may be configured, controlled and utilized to form microphone pick up patterns or "beams" to optimize directional sensitivity of the system 50, as described herein. For example, turning to FIGS. 8A-8C, a variety of steerable beams 90a-g may be formed using the microphones of the various modules 100,200,300 of the system 50. In FIG. 8A, such a system 50 includes three microphone modules 100,200,300 connected in a daisy chained fashion as described herein. Under the control of a connected control module (not shown), the microphone modules 100,200,300 may be used to form a variety of beams 90a-g having various shapes, sizes, and directional pick up patterns. For example, as seen in FIG. 8A, a first beam 90a may be formed by the system 50 using only the first module 100, and extending in an oval shaped fashion in a direction transverse to the module 100. Simultaneously, a second beam 90b may be formed using the second and third modules 200,300, and extending in a wider oval shaped manner, also transverse to the length of the modules 200, 300. In this way, the control module 62 can operate the modules 100,200,300 of the system 50 independently or in concert to form a variety of beams 90a,b. The beams can be entirely within a single module 100, such as beam 90a. Or alternatively the beams can be across multiple modules 200,300, such as beam 90b.

Figure 8B:
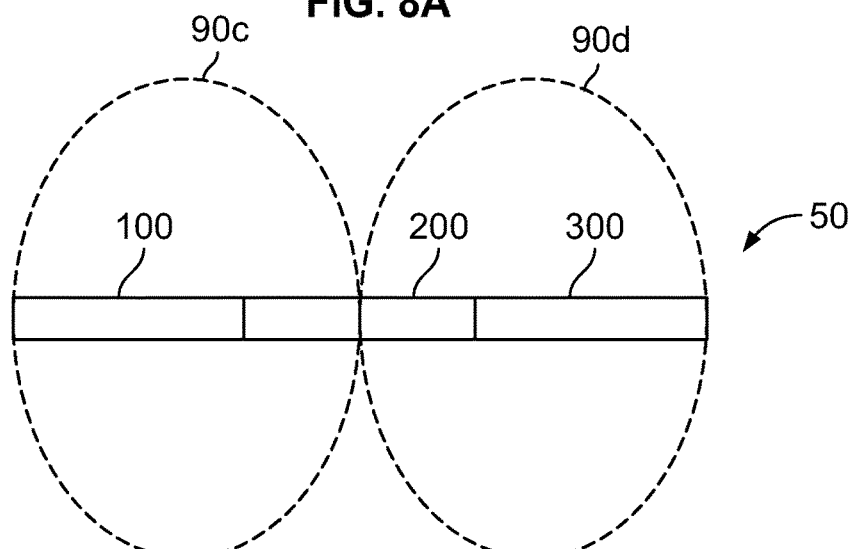
FIG. 8B is a top view of an alternative embodiment of the system of FIG. 8A, having an alternative beam formation geometry.

Turning to FIG. 8B, another embodiment of the system 50 of FIG. 8A is depicted, in which a plurality of beams 90c,d are formed across a plurality of modules 100,200,300. In this embodiment, a first beam 90c is formed across a first module 100 and a portion of a second module 200. A second beam 90d is formed across a portion of the second module 200 and a third module 300. Thus, the control module 62 uses three microphone modules 100,200,300 to create a pair of symmetrical beams 90*c,d* which are oval shaped pick up patterns extending from and transverse to the modules 100,200,300.

Figure 8C:
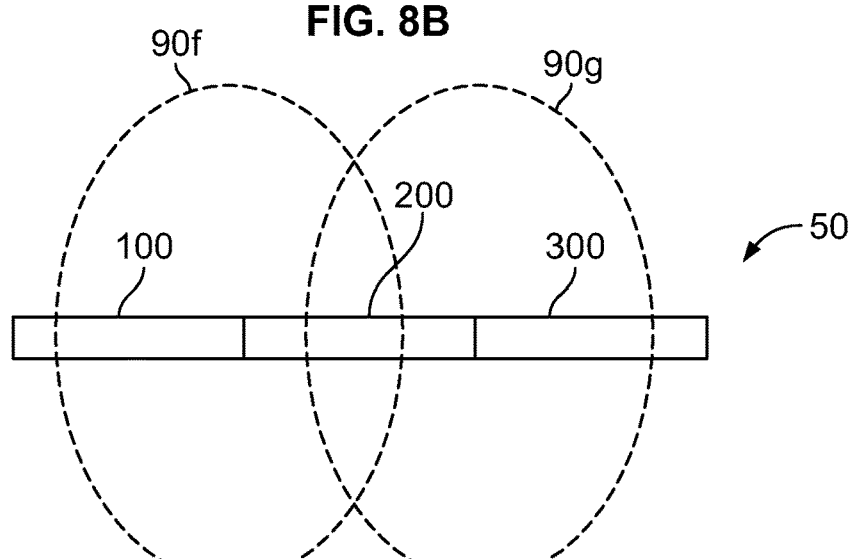
FIG. 8C is a top view of yet another alternative embodiment of the system of FIG. 8A, having another alternative beam formation geometry.

In yet another embodiment depicted in FIG. 8C, the system 50 of FIG. 8A is configured to create overlapping beams 90*f,g*. In this embodiment, a first beam 90*f* is formed across a portion of a first module 100 and a portion of a second module 200. A second beam 90*g* is formed across a portion of the second module 200 and a portion of a third module 300. Both beams 90*f,g* are oval shaped pick up patterns extending from and transverse to the modules 100,200,300. However, in this embodiment, the beams 90*f,g* overlap to achieve the desired pick up pattern depicted in FIG. 8C.

Therefore, the control module 62 can use the microphones 120 of the first module 100, the microphones 220 of the second module 200 and the microphones 320 of the third module 300 to create independent beams 90*a-g* which can be created entirely on one module 100,200,300, extend across multiple modules 100,200,300 and can be distinct and separate from one another (such as the beams 90*a-d* in FIGS. 8A-8B) or can overlap (such as the beams 90*f,g* in FIG. 8C). In this way, the microphones of the various modules 100, 200,300 can be used to form beams 90*a-g* of a variety of shapes, sizes, and directions. Moreover, audio signals received by a microphone 120 aboard one of the modules 100 may be utilized to form multiple beams 90*a-g*. Thus, each microphone 120, 220, 320 of the system 50 can participate in forming multiple beams 90*a-g* such as the microphones 220 of the second module 200 depicted in FIG. 8C, which participate in forming both beams 90*f,g* shown.

Figure 9:
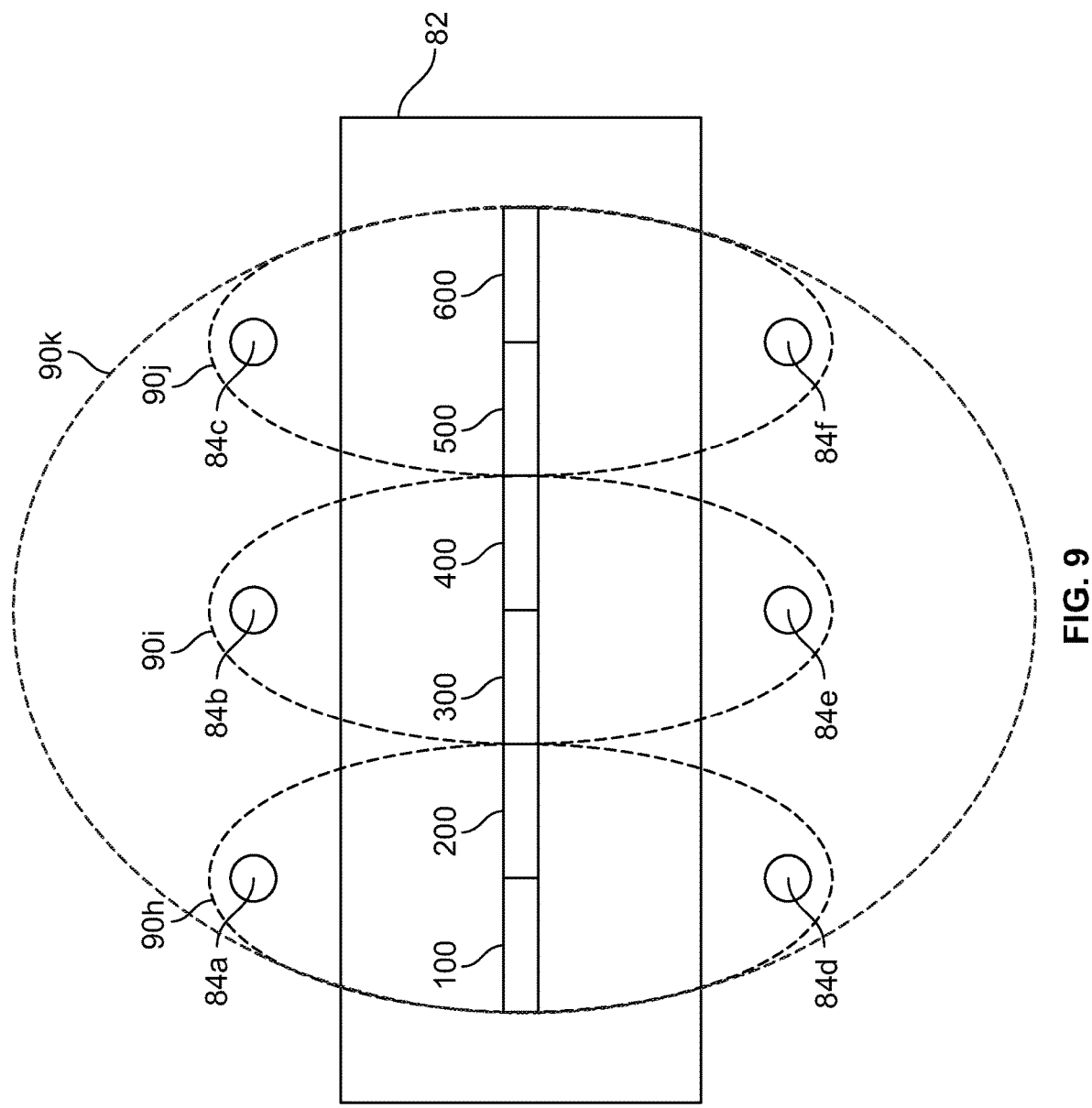
FIG. 9 is a top view of a system of microphone modules according to an embodiment of the present invention deployed in a conference room environment and surface mounted on the top surface of a conference table.

Turning to FIG. 9, another application of a system 50 according to the embodiments described herein is depicted. In the depicted application, the system 50 is deployed in a conference room setting, which includes a conference table 82 and a plurality of sound sources, in this case humans talking, or "talkers" 84*a-f*, positioned around the table 82. In the configuration shown, six talkers 84*a-f* are positioned around the conference table 82, with three talkers 84*a,b,c* on one side of the table 82 and three talkers 84*d,e,f* on the opposite side of the table 82. A system 50 is deployed in the environment which includes six microphone modules 100, 200,300,400,500,600 connected to a control module (not shown). The six modules 100,200,300,400,500,600 are connected in a daisy chained fashion to create a microphone array, which in this case is positioned on a top surface of the conference table 82.

The control module (not shown) has configured the system 50 to create a plurality of beams 90*h,i,j,k* for the purposes of picking up the sounds and audio created by the talkers 84*a-f*. As depicted in FIG. 9, three high frequency beams 90*h,i,j* have been created by the system 50, each of the beams 90*h,i,j* being a similarly sized and shaped oval pick up pattern extending transversely from the modules 100,200,300,400,500,600. The first high frequency beam 90*h* is created across the first and second modules 100,200, extending in opposite directions from the modules 100,200 so as to create directional pick up patterns to optimally pick up audio from two talkers 84*a,d* seated across from each other proximate a left end of the conference table 82. The second high frequency beam 90*i* is created across the third and fourth modules 300,400, extending in opposite directions from the modules 300,400 so as to create directional pick up patterns to optimally pick up audio from two talkers 84*b,e* seated across from each other proximate a center of the conference table 82. Similarly, the third high frequency beam 90*j* is created across the fifth and sixth modules 500,600, extending in opposite directions from the modules 500,600 so as to create directional pick up patters to optimally pick up audio from two talkers 84*c,f* seated across from each other proximate a right end of the conference table 82.

The system 50 further includes a low frequency beam 90*k*, which is created across all six of the modules 100-600, extending from the first module 100 to the last module 600. Like the high frequency beams 90*h,i,j*, the low frequency beam 90*k* extends in opposite directions from the modules 100-600 so as to create directional pick up patterns to optimally pick up low frequency components of all six of the talkers 84*a-f*, seated on opposing sides of the conference table 82. Therefore, the system 50 may create different beams 90*h,i,j,k* for different frequency ranges, using different subsets or portions of the modules 100-600 used to create the system. In an embodiment, low frequency audio sources are more effectively captured by physically longer arrays, such that it is optimal to use the entire length of the system of modules 100-600 to capture such low frequency sources. Conversely, it may be more effective to capture higher frequency audio sources by shorter arrays, such that it is optimal to use microphones across a subset of the available modules 100-600 to create a beam (such as beam 90*h* which is created across the first two modules 100,200).

In this way, the system 50 uses the microphones of the various connected modules 100,200,300,400,500,600 to create beams 90*h,i,j,k* which are configured for optimal pick up of audio in the environment. In the system 50 of FIG. 9, six modules 100,200,300,400,500,600 are used to create four beams 90*h,i,j,k* to capture audio signals from six talkers 84*a-f* seated around a conference table. However, given the efficient configurability of the system 50, the control module could quickly and easily reconfigure the system 50 to create greater or fewer beams 90*h,i,j,k*, or to change the shape and positioning of beams 90*h,i,j,k* to accommodate changes in the environment, without having to disconnect, move, or disturb the hardware arrangement of the modules 100,200, 300,400,500,600. This flexibility is one of many advantages provided by such a system 50 using connectible microphone modules 100. Moreover, the system 50 can move, adjust or "steer" the beams 90*h,i,j,k* such that the axis of the beams 90*h,i,j,k* is better aligned with the intended sound source so as to more optimally capture audio coming from the source.

As can be understood from the example embodiments described herein, various systems 50 using a plurality of modules 100,200,300, can be created and deployed in a variety of environments. Thus, in a system 50 including "N" modules 100, the array processor 60 may select from the available microphones 120 across the various N modules 100 in selecting audio signals to utilize for creating and forming the steerable beams 90*a-k* used by the system 50. In an embodiment, the microphones 120 which the system 50 selects, and modules 100 upon which those microphones 120 are located are based upon the number of modules 100, or "N", of the system 50. Therefore, for example, a system 50 having three modules 100 may utilize different microphones 120 across the modules to form an optimal beam to pick up directional sound from a source, than in a system 50 having six modules 100. Therefore, in an embodiment, the array processor 60 determines the number of modules 100 available to the system 50, or "N", as well as the number of microphones 120, and uses this data in beam forming as described herein. In other embodiments, other data may be collected from the system 50 and used in configuration of the number, size, and shape of the microphone beams.

The systems 50 described herein generally refer to pick up of audio from acoustic sources within the audible spectrum (approximately 20 Hz-20 KHz). However, the systems 50 described herein are not limited to acoustic signals within the audible spectrum and can be configured to pick up acoustic sources of varying frequencies. Therefore, as used herein, "audio sources" and "audio bus" should not be construed to be limited in any way with respect to the frequency of such signals—rather such terms are intended to include detection of all ranges of acoustic signals. Therefore, the microphones 120 of the various modules 100 and systems 50 described herein can be any variety of transducers, including transducers that are capable of detecting acoustic signals outside of the audible frequency range—for example, ultrasound waves. In manners similar to those described herein, the systems 50 and modules 100 of the present disclosure can be configured to detect such other acoustic signals and to process and transmit them in a similar manner to the audio signals described herein.

In various embodiments, the modules 100 themselves, including the general shape and configuration of the modules 100 and their housings 110 may take on a variety of shapes. For example, the modules 100 may be elongated and linear such as some of the embodiments shown herein. Alternatively, the modules 100 may be arced, circular, square, rectangular, cross-shaped, intersecting, parallel or other arrangements. The modules 100 may include more than two connectors on them, so that they may be mechanically connected to one another to form systems 50 of modules 100 of varying shapes, sizes and configurations. For example, the modules 100 may be connected together to extend in two dimensions (such as a cross-shaped arrangement, or rectangular arrangement of modules), or in three dimensions (such as modules connected in a cube, sphere, or other three dimensional shape). In an embodiment, a system 50 may include three dimensional configuration of modules 100 interconnected to one another so as to form an object which may be placed in an environment, for example, by suspending the system from the ceiling in a "chandelier like" fashion.

In alternative embodiments, it should be understood that other audio bus configurations may be utilized. For example, a system of modules may be used where the modules are mechanically interconnected to form an array of modules, without the audio being passed "upstream" through each module, but rather using a different audio signal routing. In one such embodiment, audio signals from each module in the system can be routed to a central point or hub, and then from that central point, upstream to the array processor. Such a configuration may be referred to as a "hub and spoke" configuration, or "star topology." In other embodiments, a plurality of hubs may be used, whereby each hub collects audio signals from a plurality of connected modules, and passes the combined audio up to one or more array processors. Other configurations of audio routing are possible as well.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A modular array microphone system comprising:
   (A) an audio bus;
   (B) a first microphone module comprising:
       a first plurality of microphones;
   an array processor in communication with the audio bus; and
   a first module processor in communication with the first plurality of microphones, the array processor, and the audio bus; and
   (C) a second microphone module in communication with the first microphone module, the second microphone module each comprising:
       a second plurality of microphones; and
       a second module processor in communication with the second plurality of microphones and the audio bus;
       wherein the array processor of the first microphone module, the first module processor of the first microphone module, and the second module processor of the second microphone module are configured to:
       (i) detect a quantity and a connection order of the first microphone module and the second microphone module; and
       (ii) in response to detecting the quantity and the connection order of the first microphone module and the second microphone module, configure the audio bus to route audio signals from the first plurality of microphones and the second plurality of microphones to the array processor.

2. The system of claim 1, wherein:
   the first microphone module and the second microphone module each comprise a housing;
   the first plurality of microphones is arranged along a length of the housing of the first microphone module, each of the first plurality of microphones positioned generally in a direction transverse to the length; and
   the second plurality of microphones is arranged along a length of the housing of the second microphone module, each of the second plurality of microphones positioned generally in a direction transverse to the length.

3. The system of claim 1, wherein the audio bus comprises a time division multiplex (TDM) bus having a plurality of audio channels.

4. The system of claim 3, wherein the plurality of audio channels carries the audio signals from the first plurality of microphones and the second plurality of microphones.

5. The system of claim 4, wherein one of the array processor, the first module processor, or the second module processor time-aligns the audio signals from the first plurality of microphones and the second plurality of microphones.

6. The system of claim 1, wherein the array processor receives the audio signals from the first plurality of microphones and the second plurality of microphones.

7. The system of claim 6, wherein the array processor processes the audio signals to create at least one steerable beam.

8. The system of claim 7, wherein the at least one steerable beam comprises at least one of the audio signals from the first plurality of microphones and the second plurality of microphones.

9. The system of claim 7, wherein the at least one steerable beam is formed over the first microphone module and the second microphone module.

10. The system of claim 7, wherein the at least one steerable beam comprises a plurality of steerable beams, and wherein at least a portion of two of the plurality of steerable beams are formed over the first microphone module and the second microphone module.

11. The system of claim 7, wherein the at least one steerable beam comprises a plurality of steerable beams, and wherein at least a portion of a first one of the plurality of steerable beams overlaps at least a portion of a second one of the plurality of steerable beams.

12. The system of claim 7, wherein the array processor is configured to use the audio signals to create the at least one steerable beam by selecting and combining audio from at least two microphones from the first plurality of microphones and the second plurality of microphones.

13. The system of claim 1, wherein the first microphone module and the second microphone module each comprise at least one connector for connecting the audio bus with the array processor, the first module processor, and the second module processor.

14. The system of claim 1, wherein the first microphone module and the second microphone module are in communication via a connector selected from the group consisting of: digital parallel/serial interfaces, analog parallel/serial interfaces, wireless interfaces, and wired interfaces.

15. The system of claim 1, wherein one or more of the array processor, the first module processor, or the second module processor comprises an FPGA device.

16. The system of claim 1, wherein the first plurality of microphones is arranged such that a first cluster of the first plurality of microphones is formed near a middle of the length of a housing of the first microphone module.

17. The system of claim 16, wherein the first plurality of microphones is arranged such that a second cluster of the first plurality of microphones is formed near a first end of the housing of the first microphone module.

18. The system of claim 17, wherein the first plurality of microphones is arranged such that a third cluster of the first plurality of microphones is formed near a second end of the housing of the first microphone module.

19. The system of claim 1, wherein the second plurality of microphones is arranged such that a first cluster of the second plurality of microphones is formed near a middle of the length of a housing of the second microphone module.

20. The system of claim 19, wherein the second plurality of microphones is arranged such that a second cluster of the second plurality of microphones is formed near a first end of the housing of the second microphone module.

21. The system of claim 20, wherein the second plurality of microphones is arranged such that a third cluster of the second plurality of microphones is formed near a second end of the housing of the second microphone module.

22. A microphone module comprising:
an audio bus;
a first plurality of microphones each in communication with the audio bus;
an array processor in communication with the audio bus; and
a module processor in communication with the first plurality of microphones and the audio bus;
wherein the array processor and the module processor are configured to:
(i) detect the presence of at least one other microphone module in communication with the audio bus;
(ii) in response to detecting the presence of the at least one other microphone module, detecting a quantity and a connection order of the microphone module and the at least one other microphone module; and
(iii) configure the audio bus to route audio signals from the first plurality of microphones and the at least one other microphone module to the array processor.

23. The microphone module of claim 22, further comprising a housing, wherein the first plurality of microphones is arranged along a length of the housing, each of the first plurality of microphones positioned generally in a direction transverse to the length.

24. The microphone module of claim 22, wherein the audio bus comprises a time division multiplex (TDM) bus having a plurality of audio channels.

25. The microphone module of claim 24, wherein the plurality of audio channels carries a first plurality of audio signals from the first plurality of microphones and a second plurality of audio signals from the at least one other microphone module.

26. The microphone module of claim 25, wherein either the array processor or the module processor time-aligns the first plurality of audio signals and the second plurality of audio signals.

27. The microphone module of claim 22, wherein:
the at least one other microphone module comprises a second plurality of microphones; and
the array processor receives a first plurality of audio signals from the first plurality of microphones and a second plurality of audio signals from the second plurality of microphones.

28. The microphone module of claim 27, wherein the array processor processes the first plurality of audio signals and the second plurality of audio signals to form at least one steerable beam.

29. The microphone module of claim 28, wherein the steerable beam comprises audio signals from at least one of the first plurality of microphone signals and at least one of the second plurality of microphone signals.

* * * * *